US00RE50704E

(19) United States
(12) Reissued Patent
Rama Chandran

(10) Patent Number: US RE50,704 E
(45) Date of Reissued Patent: Dec. 16, 2025

(54) APPARATUS AND METHOD FOR SIGNALING OF MESSAGE SEQUENCING FOR FRONTHAUL INTERFACE

(71) Applicant: Samsung Electronics Co., Ltd., Suwon-si (KR)

(72) Inventor: Sanil Rama Chandran, McKinney, TX (US)

(73) Assignee: Samsung Electronics Co., Ltd., Suwon-si (KR)

(21) Appl. No.: 18/593,761

(22) Filed: Mar. 1, 2024

Related U.S. Patent Documents

Reissue of:
(64) Patent No.: 11,729,773
Issued: Aug. 15, 2023
Appl. No.: 17/161,412
Filed: Jan. 28, 2021

U.S. Applications:
(60) Provisional application No. 63/132,274, filed on Dec. 30, 2020.

(51) Int. Cl.

| | |
|---|---|
| ***H04L 69/22*** | (2022.01) |
| ***H04W 28/06*** | (2009.01) |
| ***H04W 72/12*** | (2023.01) |
| ***H04W 72/1268*** | (2023.01) |
| ***H04W 72/1273*** | (2023.01) |
| ***H04W 72/20*** | (2023.01) |

(52) U.S. Cl.
CPC ..... *H04W 72/20* (2023.01); *H04L 69/22* (2013.01); *H04W 28/06* (2013.01); *H04W 72/1268* (2013.01); *H04W 72/1273* (2013.01)

(58) Field of Classification Search
CPC ..... H04W 72/1273; H04W 28/06; H04W 72/1268; H04W 72/20; H04L 69/22
See application file for complete search history.

(56) References Cited

U.S. PATENT DOCUMENTS

| | | | | |
|---|---|---|---|---|
| 2019/0289497 | A1* | 9/2019 | Rajagopal | H04L 25/0256 |
| 2021/0120527 | A1* | 4/2021 | Rhim | H04W 72/0406 |
| 2021/0120531 | A1* | 4/2021 | Jeon | H04B 7/0695 |
| 2021/0135722 | A1* | 5/2021 | Ahmed | H04B 7/0634 |
| 2021/0136788 | A1* | 5/2021 | Lim | H04W 72/1278 |
| 2021/0385169 | A1* | 12/2021 | Urman | H04L 45/24 |
| 2022/0095160 | A1* | 3/2022 | Thelen | H04L 27/2655 |
| 2022/0110017 | A1* | 4/2022 | Medeiros | H04W 28/0289 |
| 2022/0182172 | A1* | 6/2022 | Nath | H04L 5/0053 |

OTHER PUBLICATIONS

"O-RAN Fronthaul Working Group: Control, User and Synchronization Plane Specification", O-RAN.WG4.CUS.0-04.00 (Year: 2020).*

(Continued)

*Primary Examiner* — Ovidio Escalante

(57) ABSTRACT

An O-RAN packet to be transmitted includes a header having a packet sequence number that is independent of an uplink/downlink direction in which the packet is to be transmitted. The header, which may be an eCPRI or RoE header, is generated without regard for a data direction bit. The packet sequence number is generated within a sequence count generator of the controller that operates separately from generation of a remainder of the packet and that ignores the data direction bit.

14 Claims, 7 Drawing Sheets

(56) References Cited

OTHER PUBLICATIONS

Anil Umesh et al, 'Overview of O-RAN Fronthaul Specifications', Jul. 31, 2019, pp. 46-59 (Year: 2019).*
"O-RAN Fronthaul Working Group, Control, Userand Synchronization Plane Specification", O-RAN.WG4.CUS.0-v04.00, O-RAN Alliance, Jul. 2020, 258 pages.
"Common Public Radio Interface: eCPRI Interface Specification," eCPRI Specification v2.0, May 10, 2019, 109 pages.

* cited by examiner

APPARATUS AND METHOD FOR SIGNALING OF MESSAGE SEQUENCING FOR FRONTHAUL INTERFACE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION AND CLAIM OF PRIORITY

This application *is a reissue of U.S. Pat. No. 11,729,773 issued Aug. 15, 2023 on U.S. patent application Ser. No. 17/161,412, filed on Jan. 28, 2021, which* claims priority under 35 U.S.C. § 119(e) to U.S. Provisional Patent Application No. 63/132,274 filed Dec. 30, 2020. The above-identified patent document is incorporated herein by reference.

TECHNICAL FIELD

The present disclosure relates generally to control signal messaging in radio access networks and, more specifically, to enabling practical implementation of packet sequence numbering in wireless communications systems including such networks.

BACKGROUND

The control signal messaging interface between a radio unit (RU) and the central unit (CU)/distributed unit (DU) of an Open Radio Access Network (O-RAN) wireless communication system needs improvement. The current O-RAN specification requires a specific way of sequencing messages sent from a transmitter to a receiver, imposing limitations in practical implementation of the O-RAN front-haul interface.

SUMMARY

An O-RAN packet to be transmitted includes a header having a packet sequence number that is independent of an uplink/downlink direction in which the packet is to be transmitted. The header, which may be an eCPRI or RoE header, is generated without regard for a data direction bit. The packet sequence number is generated within a sequence count generator of the controller that operates separately from generation of a remainder of the packet and that ignores the data direction bit.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
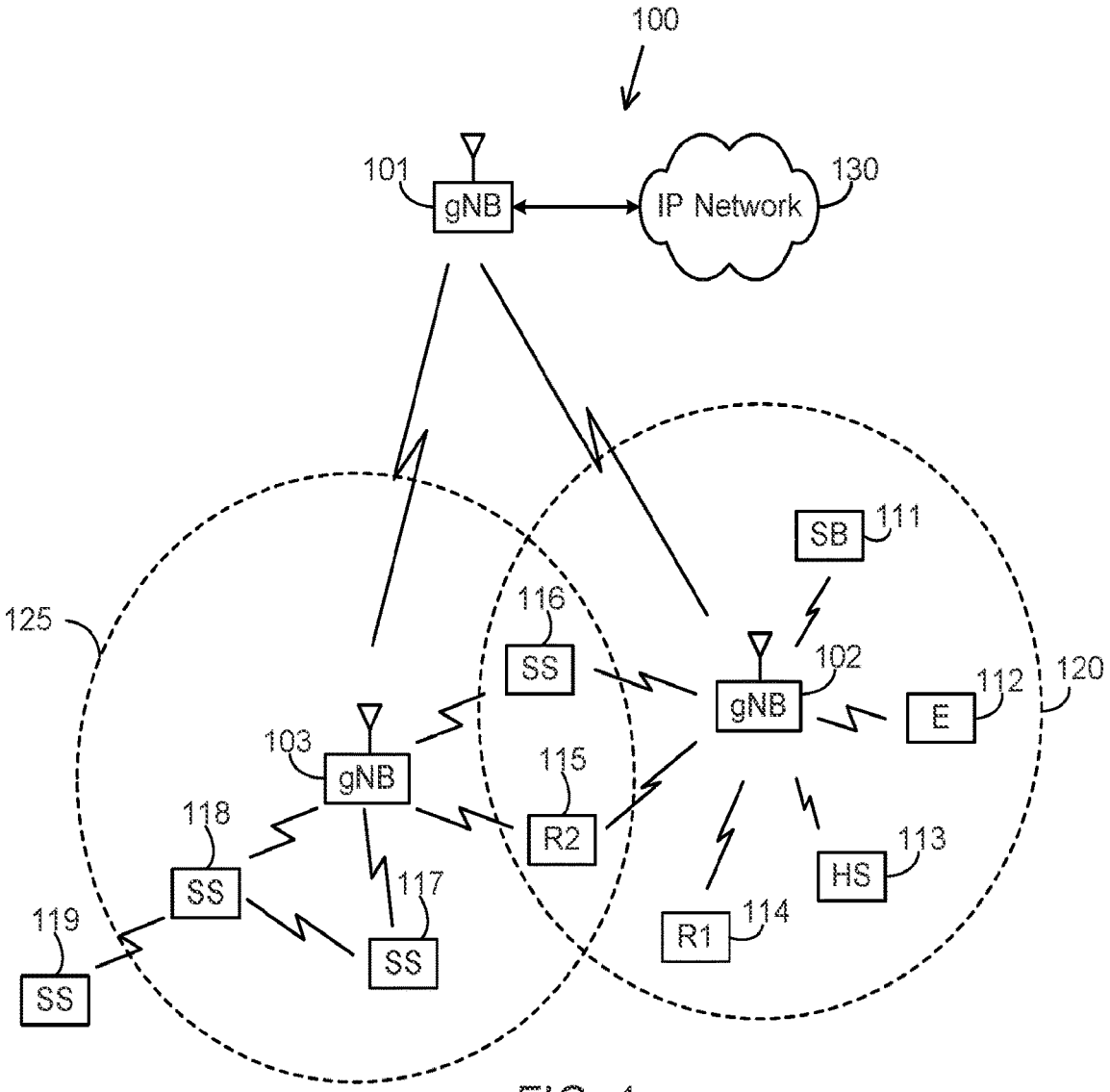
FIG. 1 illustrates an example wireless network utilizing packet sequence numbering and checking according to embodiments of the present disclosure enable practical implementation of the O-RAN front-haul interface.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

The following document(s) and standards description(s) are hereby incorporated by reference into the present disclosure: "O-RAN Fronthaul Working Group, Control, User and Synchronization Plane Specification 4.0" (July 2020) (document O-RAN.WG4.CUS 0.0-v04.00); and "Common Public Radio Interface: eCPRI Interface Specification," eCPRI Specification v2.0 (May 10, 2019).

As noted above, the current O-RAN specification requires a specific way of sequencing messages sent from a transmitter to a receiver, imposing limitations in practical implementation of the O-RAN front-haul interface. Specifically, sequencing of messages—O-RAN front-haul messages sent and received over an Enhanced Common Public Radio Interface (eCPRI) or Radio over Ethernet (RoE) transport layer—over the front-haul interface is specified per type of message, which requires the message parser at the receiver to remember the message type to determine message validity (e.g., duplicate messages, a dropped message, or incorrect order of messages). The present disclosure provides solutions enabling practical implementations. One solution is to change the sequence identifier generation architecture by using a common sequence number generator and common sequence number checker rather than different sequence number generators and checkers for different message types. Another solution is to define one bit of the sequence identifier field Sequence Id to indicate whether the control-plane message is for uplink or downlink. A third solution defines a starting value for the Sequence Id field on a per message type basis and configures the starting value via a management interface.

In the following, for brevity, both frequency division duplexing (FDD) and time division duplexing (TDD) are considered as the duplex method for both downlink (DL) and uplink (UL) signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "beyond 4G network" or a "post LTE system."

The 5G communication system is considered to be implemented in higher frequency (millimeter wave or "mmWave") bands, e.g., 60 gigahertz (GHz) bands, so as to accomplish higher data rates. To decrease propagation loss of the radio waves and increase the transmission coverage, the beamforming, massive multiple-input multiple-output (MIMO), full dimensional MIMO (FD-MIMO), array antenna(s), analog beam forming, large scale antenna techniques and the like are contemplated for 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) are contemplated as an adaptive modulation and coding (AMC) technique, and filter bank multi carrier (FBMC), non-orthogonal multiple access (NOMA), and sparse code multiple access (SCMA) are contemplated as an advanced access technology.

FIGS. 1-4 below describe various embodiments of the present disclosure implemented in wireless communications systems. The descriptions of FIGS. 1-4 are not meant to imply physical or architectural limitations to the manner in which different embodiments may be implemented. Different embodiments of the present disclosure may be implemented in any suitably-arranged communications system.

FIG. 1 illustrates an example wireless network utilizing packet sequence numbering and checking according to embodiments of the present disclosure enable practical implementation of the O-RAN front-haul interface. The embodiment of the wireless network shown in FIG. 1 is for illustration only. Other embodiments of the wireless network 100 could be used without departing from the scope of the present disclosure.

As shown in FIG. 1, the wireless network includes a base station (gNB or gNodeB) 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R1); a UE 115, which may be located in a second residence (R2); and a UE 116, which may be a mobile device (M), such as a cell phone, a wireless laptop, a wireless personal digital assistant (PDA), or the like. The gNB 103 provides wireless broadband access to the network 130 for a second plurality of UEs within a coverage area 125 of the gNB 103. The second plurality of UEs includes the UE 115 and the UE 116, as well as subscriber stations (SS, for example, UEs) 117, 118 and 119. In some embodiments, one or more of the gNBs 101-103 may communicate with each other and with the UEs 111-116 using existing wireless communication techniques, and one or more of the UE 111-119 may communicate directly with each other (e.g., UEs 117-119) using other existing or proposed wireless communication techniques.

Depending on the network type, the term "base station" or "BS" can refer to any component (or collection of components) configured to provide wireless access to a network, such as transmit point (TP), transmit-receive point (TRP), an enhanced (or "evolved") base station (eNodeB or eNB), a 5G base station (gNB), a macrocell, a femtocell, a wireless fidelity (WiFi) access point (AP), or other wirelessly enabled devices. Base stations may provide wireless access in accordance with one or more wireless communication protocols, e.g., 5G 3GPP New Radio (NR) interface/access, Long Term Evolution (LTE), LTE Advanced (LTE-A), high speed packet access (HSPA), Wi-Fi 802.11a/b/g/n/ac, etc. For the sake of convenience, the various names for a base station-type apparatus and functionality are used interchangeably in this patent document to refer to network infrastructure components that provide wireless access to remote terminals. Also, depending on the network type, the term "user equipment" (UE) can refer to any component such as a mobile station (MS), subscriber station (SS), remote terminal, wireless terminal, receive point, or user device. For the sake of convenience, the various names for a user equipment-type device and functionality are used interchangeably in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-119 include circuitry, programing, or a combination thereof, for efficient signaling of control message for fronthaul interface. In certain embodiments, and one or more of the gNBs 101-103 includes circuitry, programing, or a combination thereof, for CSI acquisition based on space-frequency compression in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
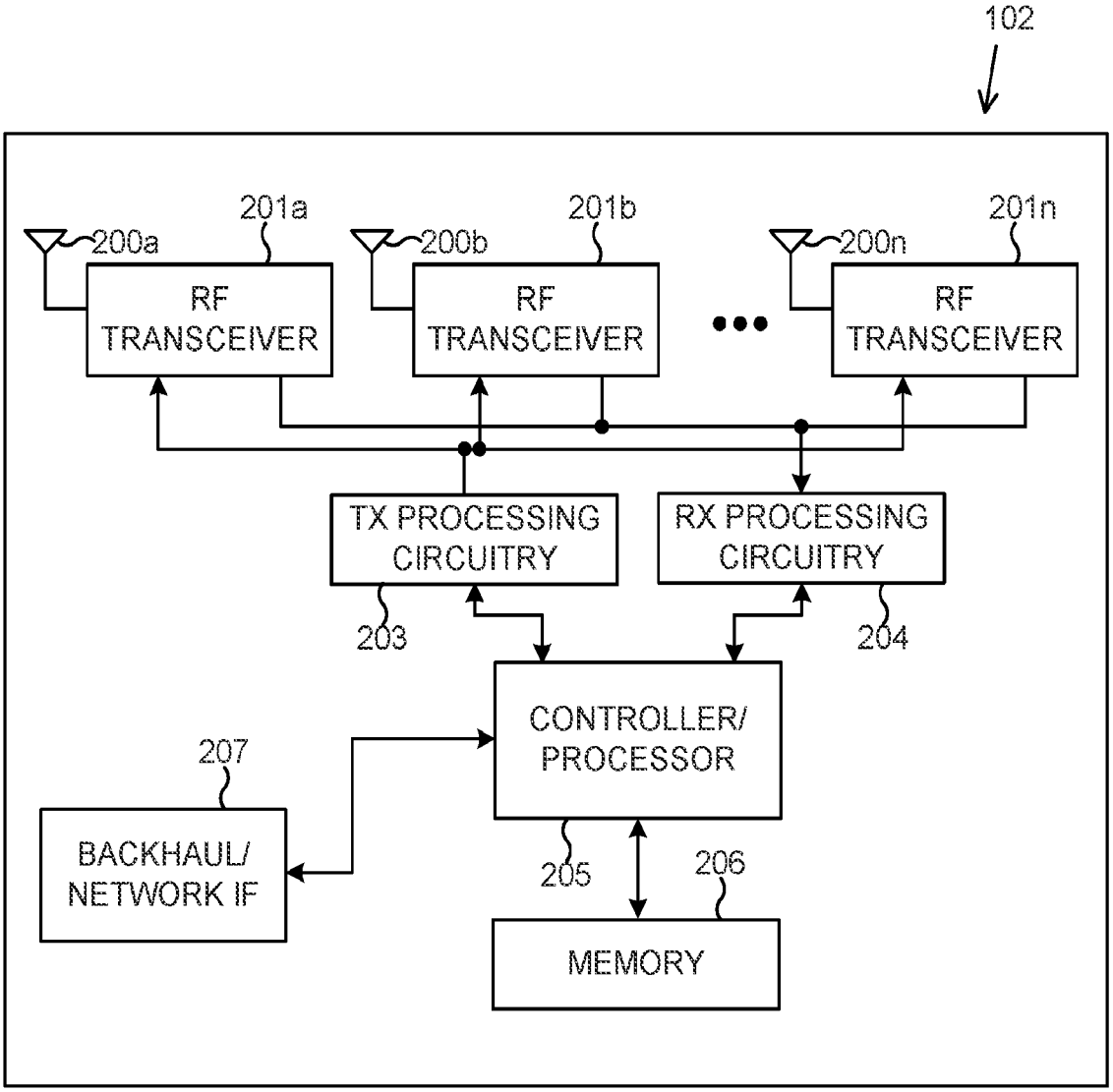
FIG. 2 illustrates an example base station utilizing packet sequence numbering and checking according to embodiments of the present disclosure according to embodiments of the present disclosure.

FIG. 2 illustrates an example base station utilizing packet sequence numbering and checking according to embodiments of the present disclosure according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 200a-200n, multiple radio frequency (RF) transceivers 201a-201n, transmit (TX) processing circuitry 203, and receive (RX) processing circuitry 204. The gNB 102 also includes a controller/processor 205, a memory 206, and a backhaul or network interface 207.

The RF transceivers 201a-201n receive, from the antennas 200a-200n, incoming RF signals, such as signals transmitted by UEs in the network 100. The RF transceivers 201a-201n down-convert the incoming RF signals to generate intermediate frequency (IF) or baseband signals. The IF or baseband signals are sent to the RX processing circuitry 204, which generates processed baseband signals by filtering, decoding, and/or digitizing the baseband or IF signals. The RX processing circuitry 204 transmits the processed baseband signals to the controller/processor 205 for further processing.

The TX processing circuitry 203 receives analog or digital data (such as voice data, web data, electronic mail, or interactive video game data) from the controller/processor 205. The TX processing circuitry 203 encodes, multiplexes, and/or digitizes the outgoing baseband data to generate processed baseband or IF signals. The RF transceivers 201a-201n receive the outgoing processed baseband or IF signals from the TX processing circuitry 203 and up-converts the baseband or IF signals to RF signals that are transmitted via the antennas 201a-201n.

The controller/processor 205 can include one or more processors or other processing devices that control the overall operation of the gNB 102. For example, the controller/processor 205 could control the reception of forward channel signals and the transmission of reverse channel signals by the RF transceivers 201a-201n, the RX processing circuitry 204, and the TX processing circuitry 205 in accordance with well-known principles. The controller/processor 205 could support additional functions as well, such as more advanced wireless communication functions.

For instance, the controller/processor 205 could support beam forming or directional routing operations in which outgoing signals from multiple antennas 200a-200n are weighted differently to effectively steer the outgoing signals in a desired direction. Any of a wide variety of other functions could be supported in the gNB 102 by the controller/processor 205.

The controller/processor 205 is also capable of executing programs and other processes resident in the memory 206, such as an operating system (OS). The controller/processor 205 can move data into or out of the memory 206 as required by an executing process.

The controller/processor 205 is also coupled to the backhaul or network interface 207. The backhaul or network interface 207 allows the gNB 102 to communicate with other devices or systems over a backhaul connection or over a network. The interface 207 could support communications over any suitable wired or wireless connection(s). For example, when the gNB 102 is implemented as part of a cellular communication system (such as one supporting 5G, LTE, or LTE-A), the interface 207 could allow the gNB 102 to communicate with other gNBs over a wired or wireless backhaul connection. When the gNB 102 is implemented as an access point, the interface 207 could allow the gNB 102 to communicate over a wired or wireless local area network or over a wired or wireless connection to a larger network (such as the Internet). The interface 207 includes any suitable structure supporting communications over a wired or wireless connection, such as an Ethernet or RF transceiver.

The memory 206 is coupled to the controller/processor 205. Part of the memory 206 could include a random access memory (RAM), and another part of the memory 206 could include a Flash memory or other read only memory (ROM).

Although FIG. 2 illustrates one example of gNB 102, various changes may be made to FIG. 2. For example, the gNB 102 could include any number of each component shown in FIG. 2. As a particular example, an access point could include a number of interfaces 207, and the controller/processor 205 could support routing functions to route data between different network addresses. As another particular example, while shown as including a single instance of TX processing circuitry 203 and a single instance of RX processing circuitry 204, the gNB 102 could include multiple instances of each (such as one per RF transceiver). Also, various components in FIG. 2 could be combined, further subdivided, or omitted and additional components could be added according to particular needs.

Figure 3:
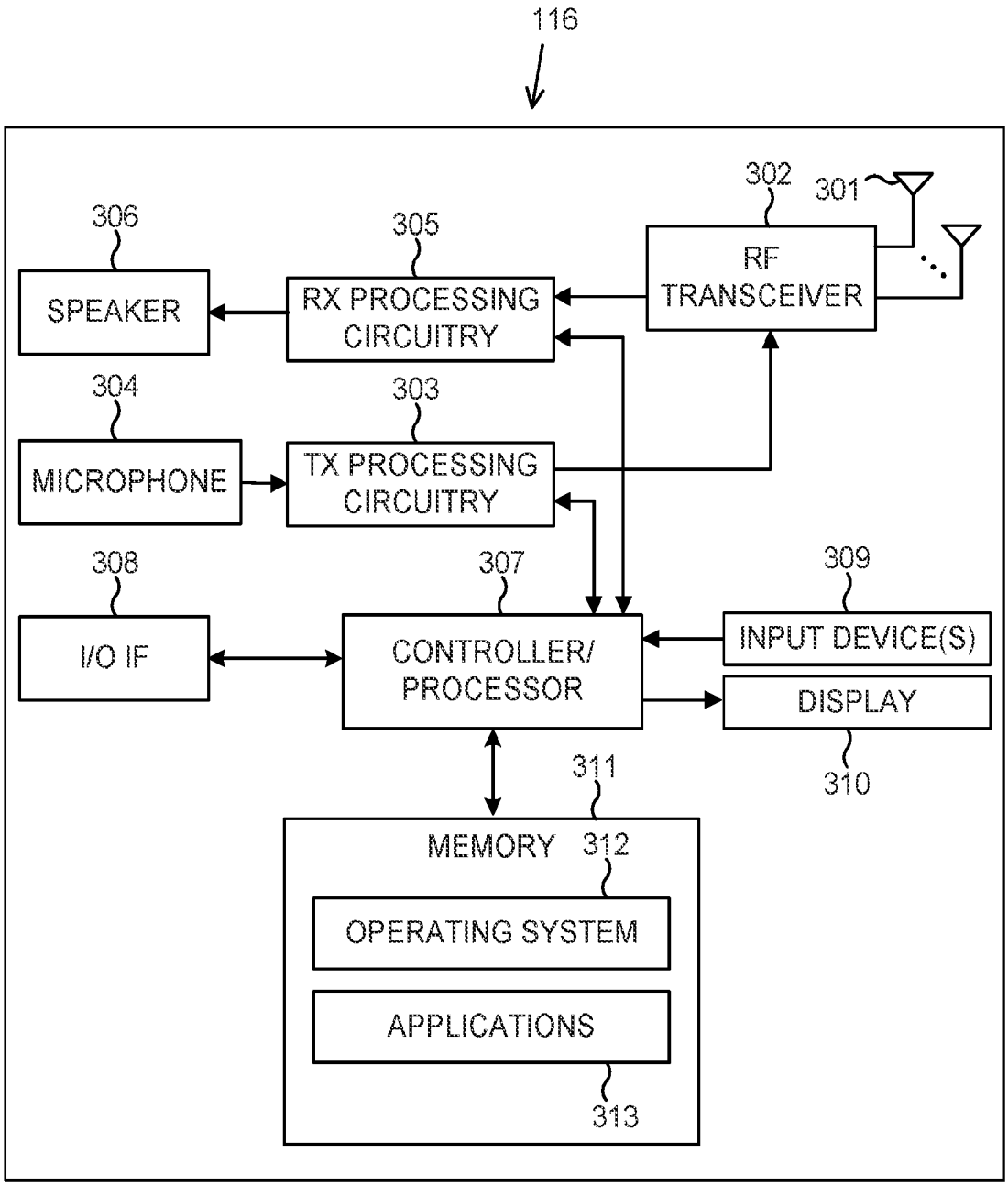
FIG. 3 illustrates an example user equipment operating within a wireless network and communicating with a base station utilizing packet sequence numbering and checking according to embodiments of the present disclosure according to embodiments of the present disclosure.

FIG. 3 illustrates an example user equipment operating within a wireless network and communicating with a base station utilizing packet sequence numbering and checking according to embodiments of the present disclosure according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 301, a radio frequency (RF) transceiver 302, TX processing circuitry 303, a microphone 304, and receive (RX) processing circuitry 305. The UE 116 also includes a speaker 306, a controller or processor 307, an input/output (I/O) interface (IF) 308, a touchscreen display 310, and a memory 311. The memory 311 includes an OS 312 and one or more applications 313.

The RF transceiver 302 receives, from the antenna 301, an incoming RF signal transmitted by an gNB of the network 100. The RF transceiver 302 down-converts the incoming RF signal to generate an IF or baseband signal. The IF or baseband signal is sent to the RX processing circuitry 305, which generates a processed baseband signal by filtering, decoding, and/or digitizing the baseband or IF signal. The RX processing circuitry 305 transmits the processed baseband signal to the speaker 306 (such as for voice data) or to the processor 307 for further processing (such as for web browsing data).

The TX processing circuitry 303 receives analog or digital voice data from the microphone 304 or other outgoing baseband data (such as web data, e-mail, or interactive video game data) from the processor 307. The TX processing circuitry 303 encodes, multiplexes, and/or digitizes the outgoing baseband data to generate a processed baseband or IF signal. The RF transceiver 302 receives the outgoing processed baseband or IF signal from the TX processing circuitry 303 and up-converts the baseband or IF signal to an RF signal that is transmitted via the antenna 301.

The processor 307 can include one or more processors or other processing devices and execute the OS 312 stored in the memory 311 in order to control the overall operation of the UE 116. For example, the processor 307 could control the reception of forward channel signals and the transmission of reverse channel signals by the RF transceiver 302, the RX processing circuitry 305, and the TX processing circuitry 303 in accordance with well-known principles. In some embodiments, the processor 307 includes at least one microprocessor or microcontroller.

The processor 307 is also capable of executing other processes and programs resident in the memory 311, such as processes for CSI reporting on uplink channel. The processor 307 can move data into or out of the memory 311 as required by an executing process. In some embodiments, the processor 307 is configured to execute the applications 313 based on the OS 312 or in response to signals received from gNBs or an operator. The processor 307 is also coupled to the I/O interface 309, which provides the UE 116 with the ability to connect to other devices, such as laptop computers and handheld computers. The I/O interface 309 is the communication path between these accessories and the processor 307.

The processor 307 is also coupled to the touchscreen display 310. The user of the UE 116 can use the touchscreen display 310 to enter data into the UE 116. The touchscreen display 310 may be a liquid crystal display, light emitting diode display, or other display capable of rendering text and/or at least limited graphics, such as from web sites.

The memory 311 is coupled to the processor 307. Part of the memory 311 could include RAM, and another part of the memory 311 could include a Flash memory or other ROM.

Although FIG. 3 illustrates one example of UE 116, various changes may be made to FIG. 3. For example, various components in FIG. 3 could be combined, further subdivided, or omitted and additional components could be added according to particular needs. As a particular example, the processor 307 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
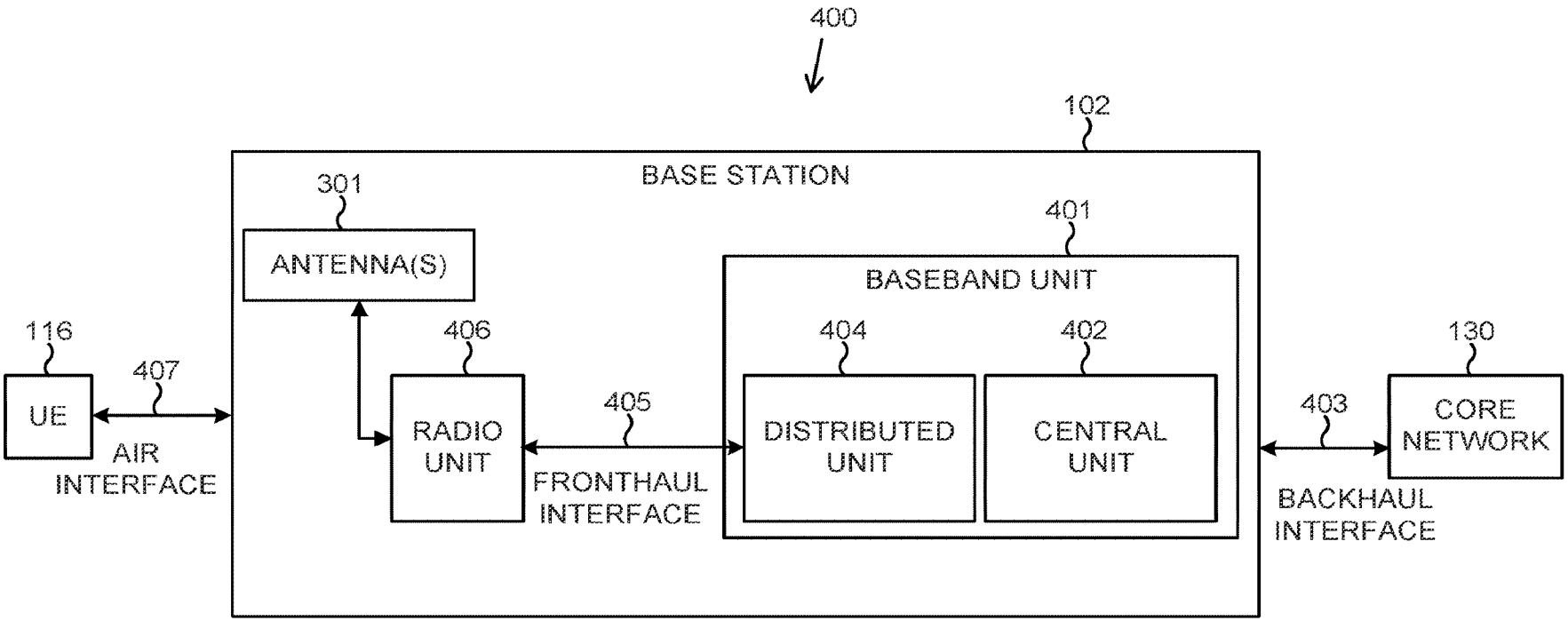
FIG. 4 illustrates an exemplary subsystem including a fronthaul interface over which packets are transmitted with sequence numbering and checking according to embodiments of the present disclosure.

FIG. 4 illustrates an exemplary subsystem including a fronthaul interface over which packets are transmitted with sequence numbering and checking according to embodiments of the present disclosure. The embodiment of the subsystem 400 illustrated in FIG. 4 is for illustration only. FIG. 4 does not limit the scope of the present disclosure to any particular implementation including a fronthaul interface.

The subsystem 400 includes gNB 102, UE 116 and core network 130 from FIGS. 1-3. The gNB 102 includes a baseband unit (BBU) 401 having a central unit (CU) 402 communicating with the core network 130 over backhaul interface 403. The BBU 401 also includes a distributed unit (DU) 404 communicating over a fronthaul interface 405 (which may be for either a wired connection or a wireless connection) with a radio unit (RU) 406, which is coupled to the antenna(s) 301 of the gNB 102. The gNB 102 communicates with the UE 116 via an air interface 407. The CU 402, DU 404 and RU 406 may be physically separate items of equipment that may be physically or geographically spaced apart from each other. Alternatively, any two (or more) of CU 402, DU 404 and RU 406 may be integrated into a single piece of equipment. The subsystem 400 depicted in FIG. 4 may form part of an LTE multicast-broadcast single frequency network (MBSFN).

According to the present disclosure, the DU 404 for the gNB 102 communicates with the RU 406 using a section header which includes a packet sequence number generated as described below, and checked by the RU 406 as described below.

Figure 5:
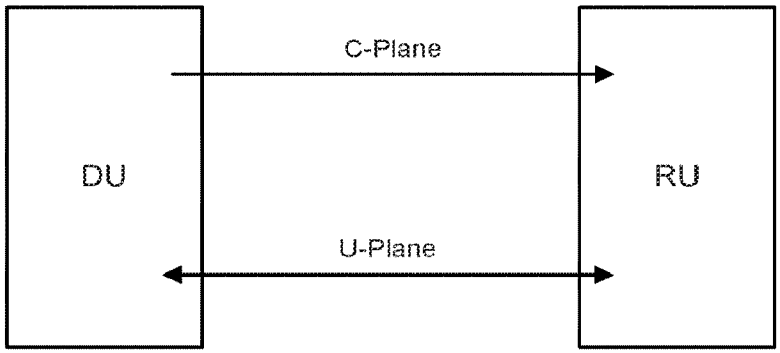
FIG. 5 illustrates control plane and user plane downlink transmissions.

FIG. 5 illustrates control plane (C-Plane) and user plane (U-Plane) downlink transmissions. As depicted, information is transmitted by a DU to an RU within a C-Plane Section (e.g., a type 1 message). User plane (U-Plane) information may also be transmitted.

O-RAN Packet Format:

The O-RAN packet format consist of Ethernet Header, eCPRI or RoE Transport Header and O-RAN Radio Application Header.

Figure 6:
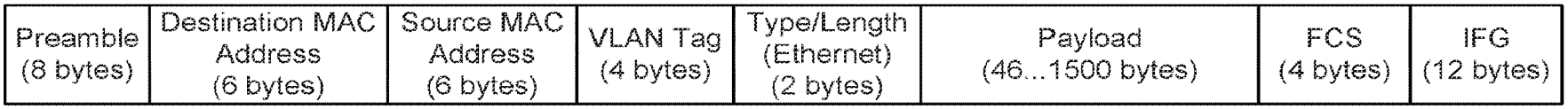
FIG. 6 illustrates the structure of an Ethernet frame used for communication between the DU and the 406 according to embodiments of the present disclosure.

FIG. 6 illustrates the structure of an Ethernet frame used for communication between the DU 404 and the RU 406 according to embodiments of the present disclosure. The Ethernet frame includes a preamble of 8 bytes length; a destination medium access control (MAC) address of 6 bytes; a source MAC address of 6 bytes; a virtual local area network (VLAN) tag of 4 bytes in the embodiment depicted; a type/length indicator of 2 bytes, indicating an Ethernet type frame; a payload ranging from 46 to 1500 bytes; a frame check sequence (FCS) of 4 bytes; and an interframe gap (IFG) of 12 bytes.

The payload in FIG. 6 includes one of an eCPRI transport header and an RoE transport header. An eCPRI transport header has the following format:

| Section Type: any | | | | | | | | | |
|---|---|---|---|---|---|---|---|---|---|
| 0 (msb) | 1 | 2 | 3 | 4 | 5 | 6 | 7 (lsb) | # bytes | |
| ecpriVersion | | | | ecpriReserved | | | C | 1 | Octet 1 |
| ecpriMessage | | | | | | | | 1 | Octet 2 |
| ecpriPayload | | | | | | | | 2 | Octet 3 |
| ecpriRtcid/ecpriPcid | | | | | | | | 2 | Octet 5 |
| ecpriSeqid | | | | | | | | 2 | Octet 7, |

The first byte of the eCPRI transport header includes a 4 bit protocol revision number ecpriVersion, 3 reserved bits ecpriReserved, and a single message concatenation indicator ecpriConcatenation bit (indicated by "C" asterisk in the table above), where C=0 indicates that the current eCPRI message is the last one inside the eCPRT protocol data unit (PDU) and C=1 indicates that another eCPRI message follows the current one within the eCPRI PDU. The second byte of the eCPRT transport header contains a message type identifier ecpriMessage identifying a type of service carried by the message, while (at least) the third and fourth bytes contain the payload ecpriPayload. Two bytes of message source and destination identifiers (ecpriRtcid for control plane messages, ecpriPcid for user plane messages) and a message sequence identifier ecpriSeqid follows the payload. The message sequence identifier ecpriSeqid is a message sequence identifier identifying the message ordering within a message stream, and is generated and checked as described below.

An RoE transport header has the following format:

| Section Type: any | | | | | | | | | |
|---|---|---|---|---|---|---|---|---|---|
| 0 (msb) | 1 | 2 | 3 | 4 | 5 | 6 | 7 (lsb) | # bytes | |
| RoEsubType | | | | | | | | 1 | Octet 1 |
| RoEflowId | | | | | | | | 1 | Octet 2 |
| RoElength | | | | | | | | 2 | Octet 3 |
| RoEorderInfo | | | | | | | | 4 | Octet 5, |

The first byte of the RoE transport header contains a message type RoEsubType identifying the type of message (e.g., control, structure agnostic, structure aware, native time domain, native frequency domain, etc.). The second byte contains a flow identifier RoEflowID allowing connections between the source and destination to be distinguished, the third and fourth bytes contain a length RoElength indicating the payload size and the next four bytes contain sequence number or timestamp RoEorderInfo. RoEorderInfo includes a field Sequence_ID, which is the message sequence identifier, and is generated and checked as described below. The payload of the respective eCPRI transport header or RoE transport header follows the eight bytes described above of the corresponding header.

The O-RAN Radio Application Header format for command frames is as follows:

| Section Type 0: idle/guard periods | | | | | | | | | |
|---|---|---|---|---|---|---|---|---|---|
| 0 (msb) | 1 | 2 | 3 | 4 | 5 | 6 | 7 (lsb) | # bytes | |
| transport header | | | | | | | | 8 | Octet 1 |
| D | payloadVersion | | | | filterIndex | | | 1 | Octet 9 |
| frameId | | | | | | | | 1 | Octet 10 |
| subframeId | | | | | slotId | | | 1 | Octet 11 |
| slotId | | | | startSymbolid | | | | 1 | Octet 12 |
| numberOfsections | | | | | | | | 1 | Octet 13 |
| sectionType = 0 | | | | | | | | 1 | Octet 14 |
| timeOffset | | | | | | | | 2 | Octet 15 |
| frameStructure | | | | | | | | 1 | Octet 17 |
| cpLength | | | | | | | | 2 | Octet 18 |
| Reserved | | | | | | | | 1 | Octet 20 |
| sectionId | | | | | | | | 1 | Octet 21 |
| sectionId | | | | rb | s | startPrbc | | 1 | Octet 22 |
| startPrbc | | | | | | | | 1 | Octet 23 |
| numPrbc | | | | | | | | 1 | Octet 24 |
| reMask[11:4] | | | | | | | | 1 | Octet 25 |
| reMask[3:0] | | | | | numSymbol | | | 1 | Octet 26 |
| ef | reserved (7 bits) | | | | | | | 1 | Octet 27 |
| reserved (8 bits) | | | | | | | | 1 | Octet 28 |
| section extensions as indicated by "ef" if any | | | | | | | | var | Octet 29 |
| sectionId | | | | | | | | 1 | Octet N |
| sectionId | | | | rb | s | startPrbc | | 1 | Octet N + 1 |
| startPrbc | | | | | | | | 1 | Octet N + 2 |
| numPrbc | | | | | | | | 1 | Octet N + 3 |
| reMask[11:4] | | | | | | | | 1 | Octet N + 4 |
| reMask[3:0] | | | | | numSymbol | | | 1 | Octet N + 5 |
| ef | reserved (7 bits) | | | | | | | 1 | Octet N + 6 |
| reserved (8 bits) | | | | | | | | 1 | Octet N + 7 |
| section extensions as indicated by "ef" if any | | | | | | | | var | Octet N + 8 |
| | | | | | | | | | Octet M |

The first eight bytes of the O-RAN Radio Application Header contain one of an eCPRI transport header and an RoE transport header. The ninth byte includes a single bit indicator of the base station data direction (transmit or receive, "dataDirection" indicated by "D" in the table above). As discussed above, the data direction bit is normally used in generating and checking a packet sequence number. In the present disclosure, the packet sequence number is independent of the data direction bit as described below. However, the data direction bit is retained in the O-RAN Radio Application Header.

The ninth byte of the O-RAN Radio Application Header also includes a 3 bit identifier of the payload protocol version (payloadVersion), and a 4 bit index for the channel filter to be used (filterIndex). The tenth byte contains a frame counter frameId, while the eleventh and twelfth bytes carry a 4 bit subframe counter subframeId, a 6 bit slot identifier slotId, and a 6 bit identifier for the number of the start symbol startSymbolid. The next byte contains an identifier of the number of data section descriptions numberOfsections, and the fourteenth byte of the O-RAN Radio Application Header specifies the characteristics of data to be transmitted or received. The fifteenth and sixteenth bytes contain a parameter timeOffset defining the offset between the start of the slot to the start of the CP, and the next byte defines the frame structure (frameStructure). The 2 byte parameter cpLength defines the length of the CP.

The O-RAN Radio Application Header is followed by one or more data sections (two explicitly shown in the table above) in the payload. A sectionId identifies an individual data section within the message, and is followed by a resource block indicator (rb), a symbol number increment command (symNum, "s" in the table above) indicating which symbol is relevant to the given sectionId, an identifier (startPrbc) of the starting physical resource block (PRB) of a data section, an identifier (numPrbc) of the number of contiguous PRBs of the data section, and a resource element (RE) mask within the PRB (reMask).

Figure 7A:
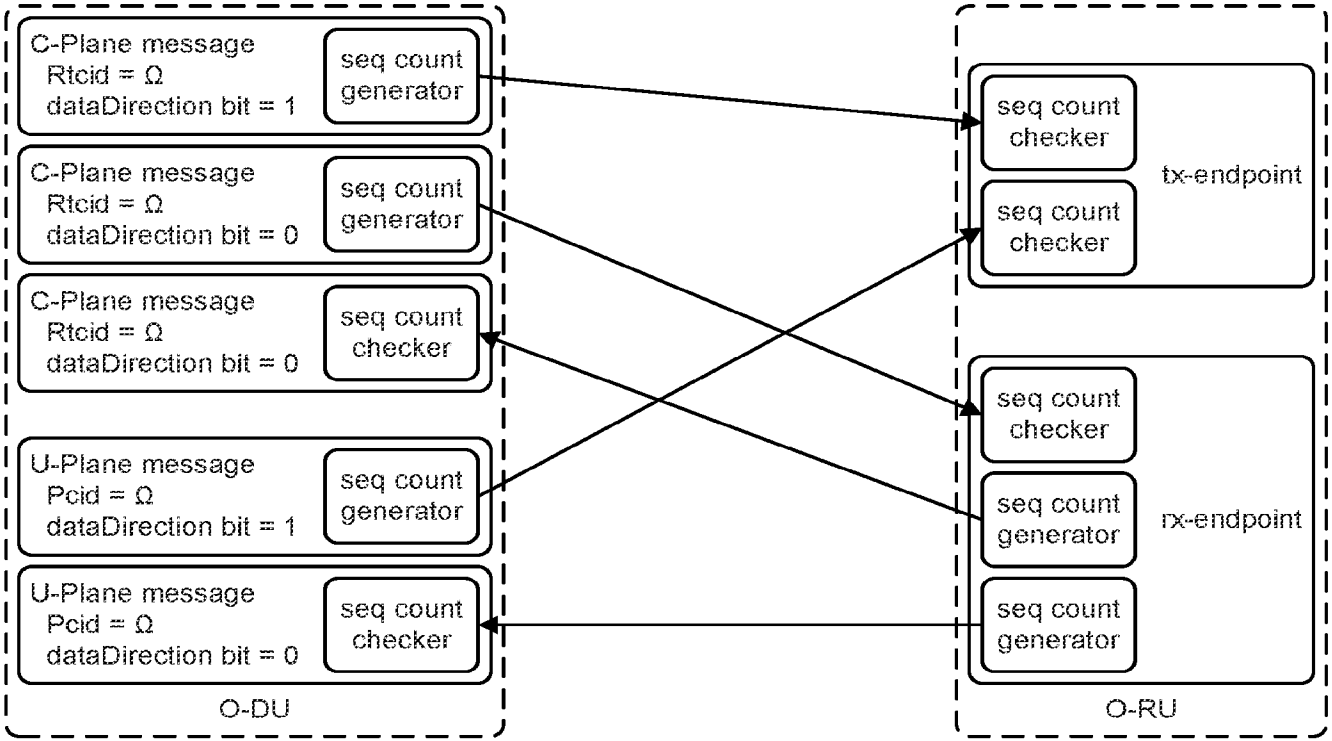
FIGS. 7A and 7B are comparative examples, respectively, of integrated packet sequence generation and checking and of packet sequence generation and checking within common blocks in accordance with embodiment of the disclosure.
Figure 7B:
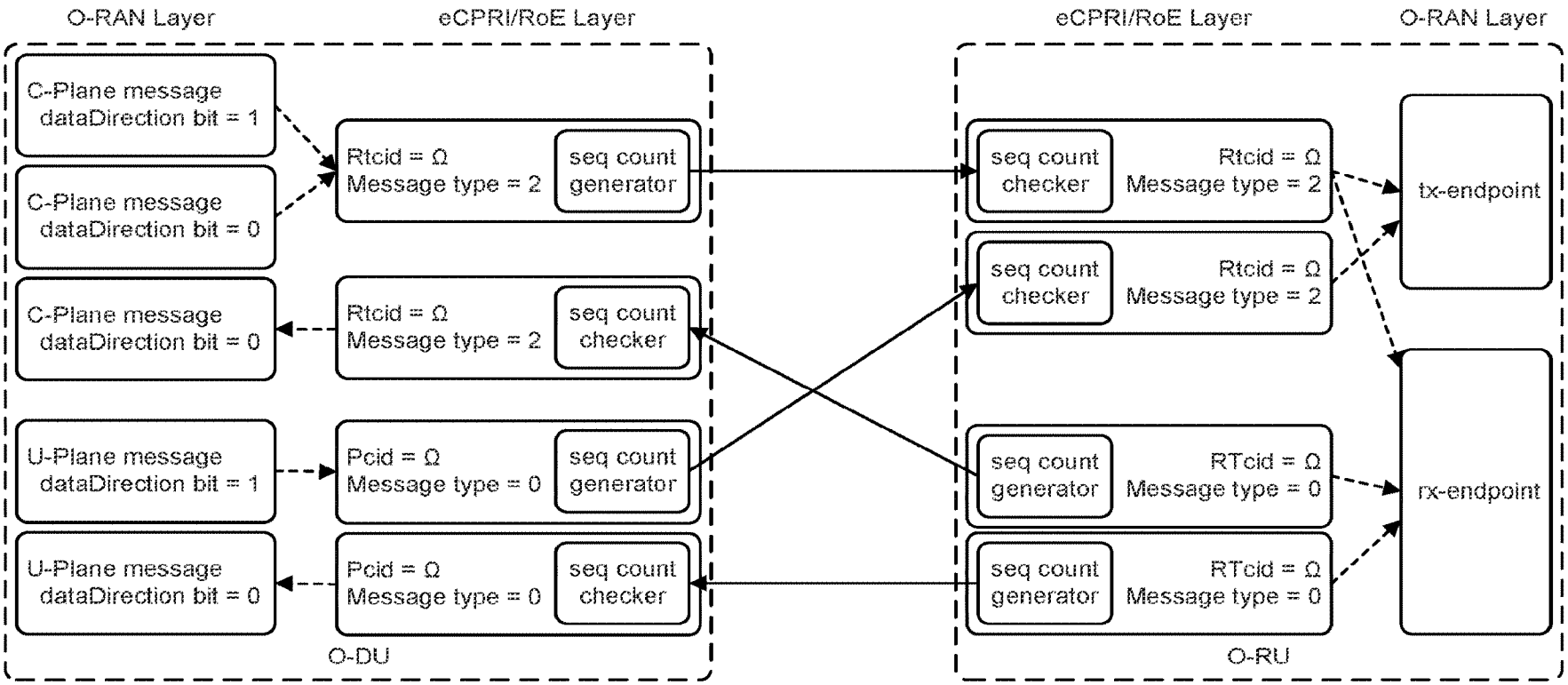

FIGS. 7A and 7B are comparative examples, respectively, of integrated packet sequence generation and checking and of packet sequence generation and checking within common blocks in accordance with embodiment of the disclosure. FIG. 7A illustrates integrated packet sequence generation and checking. Parsing of the sequence identifier information element (IE) in an eCPRI or RoE packet header is dependent on the data direction bit information element within the O-RAN Radio Application Layer Header. Both the O-DU and the O-RU must generate separate sequence counters for dataDirection bit=0 and for dataDirection bit=1, and must check sequence counters per endpoint (but separately for C-Plane and U-Plane message). Generally, parsing of a field in lower layer protocol layer header should not be dependent on a higher layer protocol header field. Currently, the sequence identifier O-RAN definition does not follow that rule, which complicates the eCPRI/RoE parser design. The situation is summarized by the table below for direction of message flow, type of flow, U-Plane data direction, same or different extended antenna-carrier (eAxC), and shared or independent sequence generator:

| Direction of message flow | Type of flow | U-Plane data direction | Same/different eAxC between UL & DL | shared/ independent sequence generator |
|---|---|---|---|---|
| O-DU → O-RU | C-Plane | DL (dataDirection bit = 1) | same or different | independent |
| O-DU → O-RU | C-Plane | UL (dataDirection bit = 0) | same or different | independent |
| O-RU → O-DU | C-Plane | UL (dataDirection bit = 0) | same or different | independent |
| O-DU → O-RU | U-Plane | DL (dataDirection bit = 1) | same or different | independent |

As evident, the sequence identifier (in eCPRI or RoE packet header) is independently assigned per DL and UL direction (indicated in O-RAN header), making the parser dependent on O-RAN Header and complicating the design of the parser.

FIG. 7B illustrates packet sequence generation and checking within common blocks in accordance with embodiment of the disclosure. The present disclosure proposed that a common sequence id generator be defined for both DL and UL C-plane messages to avoid the dependency of sequence id from data direction bit field. In FIG. 7B, the sequence identifier generation and checking functions are moved to a common block after O-RAN packet header generation and before O-RAN header parsing, respectively. This is a clean solution from a general layered architecture perspective, but is not backward compatible with existing O-RAN specifications.

An alternative to the approach of FIG. 7B involves using the most significant bit of an eCPRI/RoE sequence identifier to identify data direction bit, so that separate (non-overlapping) ranges of sequence identifiers are generated for downlink and uplink. The sequence identifier has no dependency on the O-RAN packet header, but limits the sequence identifier ranges to 0~127 instead of 0~255 and is not backward compatible with existing O-RAN specifications. This approach is summarized by the following table:

| 0 (msb) | 1 | 2 | 3 | 4 | 5 | 6 | 7 (lsb) | # octets | |
|---|---|---|---|---|---|---|---|---|---|
| | | | Sequence ID | | | | | 1 | Octet 1 |
| E bit | | | Subsequence ID | | | | | 1 | Octet 2, |

The value range for Sequence ID is {0000 0000 0000 0000b-1111 1111 1111 1111b} and the type is unsigned integer (concatenated bit fields). The field length for Sequence ID is 8 bits, while the field length of the Subsequence ID is 7 bits and of an E-bit is 1 bit.

A variant alternative to the approach of FIG. 7B involves using the Sequence ID and Subsequence ID data structures in the preceding table, and use the management plane (M-Plane) to configure a starting value for DL and UL C-plane sequence identifiers (and possibly also a configurable last-sequence identifier to simplify wrap-around logic). This variant is backward compatible when the starting value is set as 0 for both DL and UL C-plane sequence identifiers. The RU should use the M-plane parameter to identify the starting point.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A network device *configured to perform functions of a distributed unit* (*DU*), *the network device* comprising:

a controller configured to*;*

*transmit, to a radio unit* (*RU*), *a configuration message for indicating a starting value of a sequence identifier for a first control plane* (*C-plane*) *message for downlink* (*DL*) *data or a second C-plane message for uplink* (*UL*) *data,*

[receive] *obtain* a message to be transmitted *to the RU*, and generate an [Open Radio Access Network] *open radio access network* (O-RAN) packet including at least a portion of the [received] message and a header having a packet sequence number, wherein the packet sequence number is generated *based on the starting value and* independent of [an uplink/downlink] *a data* direction *field of the message*; and a transceiver coupled to the controller and configured to transmit the generated O-RAN packet to [a second network device] *the RU*.

2. The network device of claim 1, wherein the header is dependent on a message type, and wherein the header is one of an [Enhanced Common Public Radio Interface] *enhanced common public radio interface* (eCPRI) header or a [Radio over Ethernet] *radio over ethernet* (RoE) header.

3. The network device of claim 1,

*wherein a shared sequence generator is used for the first C-plane message and the second C-plane message,* wherein, *in* a *case that the message corresponds to the first C-plane message, the* data direction [bit having a value dependent upon the uplink/downlink direction in which the O-RAN packet is to be transmitted is not used for the packet sequence number inserted in the O-RAN packet] *field indicates one, and*

*wherein, in a case that the message corresponds to the second C-plane message, the data direction field indicates zero.*

4. The network device of claim 1, wherein the packet sequence number is generated within a functional block of the controller [that operates separately from generation of other content for the O-RAN packet and that ignores a data direction bit generated for the O-RAN packet], *and*

*wherein the functional block is configured to generate the packet sequence number without the data direction field of the message.*

5. The network device of claim 4, wherein the functional block of the controller comprises a sequence count generator generating the packet sequence number dependent upon a message type, and wherein the message type is one of a [control plane (] C-Plane[)] message and a user plane (U-Plane) message.

[6. The network device of claim 1, wherein the network device comprises a distributed unit (DU).]

[7. A method, comprising:

receiving, at a first network device, a message to be transmitted;

generating an Open Radio Access Network (O-RAN) packet including at least a portion of the received message and a header having a packet sequence number, wherein the packet sequence number is generated independent of an uplink/downlink direction; and transmitting the generated O-RAN packet to a second network device.]

[8. The method of claim 7, wherein the header is dependent on a message type, and wherein the header is one of an Enhanced Common Public Radio Interface (eCPRI) header or a Radio over Ethernet (RoE) header.]

[9. The method of claim 7, wherein a data direction bit having a value dependent upon the uplink/downlink direction in which the O-RAN packet is to be transmitted is not used for the packet sequence number inserted in the O-RAN packet.]

[10. The method of claim 7, wherein the packet sequence number is generated within a functional block of a controller that operates separately from generation of other content for the O-RAN packet and that ignores a data direction bit generated for the O-RAN packet.]

[11. The method of claim 10, wherein the functional block of the controller comprises a sequence count generator generating the packet sequence number dependent upon a message type, and wherein the message type is one of a control plane (C-Plane) message and a user plane (U-Plane) message.]

[12. The method of claim 7, wherein the first network device comprises a distributed unit (DU).]

13. A network device *configured to perform functions of a radio unit* (*RU*), *the network device* comprising:

a transceiver configured to*;*

*receive, from a distributed unit* (*DU*), *a configuration message for indicating a starting value of a sequence identifier for a first control plane* (*C-plane*) *message for downlink* (*DL*) *data or a second C-plane message for uplink* (*UL*) *data,* receive an [Open Radio Access Network] *open radio access network* (O-RAN) packet from [a second network device] *the DU*, the O-RAN packet including a portion of a message and a header having a packet sequence number, wherein the packet sequence number is generated [is] *based on the starting value and* independent of [an uplink/downlink] *a data* direction *field of the message*; and a controller configured to check the packet sequence number from the header.

14. The network device of claim 13, wherein the header is dependent on a message type, and wherein the header is one of an [Enhanced Common Public Radio Interface] *enhanced common public radio interface* (eCPRI) header or a [Radio over Ethernet] *radio over ethernet* (RoE) header.

15. The network device of claim 13,

*wherein a shared sequence generator is used for the first C-plane message and the second C-plane message,*

*wherein, in a case that the message corresponds to the first C-plane message, the data direction field indicates one, and* wherein, *in a case that* the [received O-RAN packet is generated independent of a data direction bit having a value dependent upon] *message corresponds to the second C-plane message,* the [uplink/downlink] *data* direction *field indicates zero.*

16. The network device of claim 15, wherein the packet sequence number is checked within a functional block of the controller [that operates separately from actions taken based on other content for the O-RAN packet], *and*

*wherein the functional block is configured to check the packet sequence number without the data direction field of the message.*

17. The network device of claim 16, wherein the functional block of the controller comprises a sequence count checker verifying the packet sequence number dependent upon a message type, and wherein the message type is one of a [control plane (] C-Plane[)] message and a user plane (U-Plane) message.

[18. The network device of claim 13, wherein the network device comprises a radio unit (RU).]

*19. A method performed by a distributed unit (DU), the method comprising:*

*transmitting, to a radio unit (RU), a configuration message for indicating a starting value of a sequence identifier for a first control plane (C-plane) message for downlink (DL) data or a second C-plane message for uplink (UL) data;*

*obtaining a message to be transmitted to the RU;*

*generating an open radio access network (O-RAN) packet including at least a portion of the message and a header having a packet sequence number, wherein the packet sequence number is generated based on the starting value and independent of a data direction field of the message; and*

*transmitting the generated O-RAN packet to the RU.*

*20. The method of claim 19,*

*wherein the header is dependent on a message type, and*

*wherein the header is one of an enhanced common public radio interface (eCPRI) header or a radio over ethernet (RoE) header.*

*21. The method of claim 19,*

*wherein a shared sequence generator is used for the first C-plane message and the second C-plane message,*

*wherein, in a case that the message corresponds to the first C-plane message, the data direction field indicates one, and*

*wherein, in a case that the message corresponds to the second C-plane message, the data direction field indicates zero.*

*22. The method of claim 21, wherein the packet sequence number is generated without the data direction field of the message.*

* * * * *